(12) United States Patent
Roseman

(10) Patent No.: US 7,971,831 B2
(45) Date of Patent: Jul. 5, 2011

(54) METHOD FOR MANUFACTURING A SOLAR MODULE IN ORBIT

(76) Inventor: Paul Roseman, Jackson Heights, NY (US)

( * ) Notice: Subject to any disclaimer, the term of this patent is extended or adjusted under 35 U.S.C. 154(b) by 1073 days.

(21) Appl. No.: 11/409,697

(22) Filed: Apr. 24, 2006

(65) Prior Publication Data

US 2009/0173831 A1 Jul. 9, 2009

Related U.S. Application Data

(60) Provisional application No. 60/680,861, filed on May 13, 2005.

(51) Int. Cl.
*B64G 1/00* (2006.01)
(52) U.S. Cl. ............... 244/159.6; 244/158.5; 244/172.8
(58) Field of Classification Search .... 244/159.4–159.6, 244/158.1, 158.4, 158.5, 172.8
See application file for complete search history.

(56) References Cited

U.S. PATENT DOCUMENTS

| | | | |
|---|---|---|---|
| 4,057,207 A | 11/1977 | Hogan | |
| 4,078,747 A | 3/1978 | Minovitch | |
| 4,579,302 A | 4/1986 | Schneider et al. | |
| 4,667,907 A | 5/1987 | Hujsak et al. | |
| 4,685,535 A | 8/1987 | Bush et al. | |
| 4,702,440 A | 10/1987 | Guenther et al. | |
| 4,728,060 A | 3/1988 | Cohen | |
| 4,730,797 A | 3/1988 | Minovitch | |
| 4,744,533 A | 5/1988 | Mullen | |
| 4,765,114 A | 8/1988 | Wesselski | |
| 4,776,541 A | 10/1988 | Maynard | |
| 4,792,108 A | 12/1988 | Bull | |
| 4,796,394 A | 1/1989 | Chastain | |
| 4,805,368 A | 2/1989 | Wesselski | |
| 4,807,833 A | 2/1989 | Pori | |
| 4,807,834 A | 2/1989 | Cohen | |
| 4,817,895 A | 4/1989 | Scott et al. | |
| 4,821,914 A | 4/1989 | Owen et al. | |

(Continued)

FOREIGN PATENT DOCUMENTS

EP 0 826 596 B1 11/2002

(Continued)

OTHER PUBLICATIONS

George C. Marshall Space Flight Center et al.,NASA Technical Memorandum 58238 Satellite Power System: Concept Development and Evaluation Program vol. VII—Space Transportation, Nov. 1981, National Aeronautics and Space Administration Scientific and Technical Information Branch.*

(Continued)

*Primary Examiner* — Joshua J Michener
(74) *Attorney, Agent, or Firm* — Miller Mayer, LLP

(57) ABSTRACT

A geosynchronous Solar Power Satellite System is created by an artificial gravity, closed ecology, multiple use structure in low earth orbit that manufactures modular solar power panels and transmitter arrays. This facility takes empty fuel tanks and expended rocket boosters from launch vehicles that are sent into low earth orbit, and re-manufactures them into structural components. These components are mated to solar cells that are launched from earth. The modular solar panels are transported to geosynchronous orbit by vehicles with ion engines, where the panels are mated to other solar panels to collect power. Structural components are also mated to transmitter elements launched from earth. These are likewise transported to geosynchronous orbit. They are mated to the solar power collecting panels and they beam the collected power back to earth.

11 Claims, 10 Drawing Sheets

U.S. PATENT DOCUMENTS

| | | | |
|---|---|---|---|
| 4,858,857 A | 8/1989 | Lange et al. | |
| 4,860,975 A | 8/1989 | Schliesing et al. | |
| 4,878,637 A | 11/1989 | Mullen | |
| 4,898,348 A | 2/1990 | Kahn | |
| 4,966,806 A | 10/1990 | Lusignea et al. | |
| 5,016,418 A | 5/1991 | Rhodes et al. | |
| 5,017,820 A | 5/1991 | Culp | |
| 5,092,545 A * | 3/1992 | Butterfield et al. | 244/158.1 |
| 5,094,409 A | 3/1992 | King et al. | |
| 5,102,150 A | 4/1992 | Kahn | |
| 5,143,327 A | 9/1992 | Martin | |
| 5,184,789 A | 2/1993 | Aldrin | |
| 5,225,632 A | 7/1993 | Gorin et al. | |
| 5,244,406 A | 9/1993 | Vranish | |
| 5,407,152 A | 4/1995 | Pelischek et al. | |
| 5,580,013 A | 12/1996 | Velke | |
| 5,833,329 A | 11/1998 | Smith et al. | |
| 5,865,401 A | 2/1999 | Watkins | |
| 6,045,094 A * | 4/2000 | Rivera | 244/159.4 |
| 6,206,328 B1 * | 3/2001 | Taylor | 244/159.6 |

FOREIGN PATENT DOCUMENTS

| | | |
|---|---|---|
| WO | 9814677 | 4/1998 |
| WO | 9819911 | 5/1998 |

OTHER PUBLICATIONS

Engquist, et al., Study of Space environment fabrication and repair techniques, Dec. 1966, Contract NAS 9-4548, Hughes Aircraft Company.*

Cover Art-Space Manufacturing 9 Proceedings to the Eleventh SSI-Princeton Conference May 1993.

"Wireless Power Transmission-A strategy for Decarbonizing Global Energy Use", Peter E. Glaser, Arthur D. Little, Inc, Space Manufacturing 9 Proceedings of the Eleventh SSI-Princeton Conference May 1993, pp. 335-341.

"The Equatorial Plane—The International Gateway to Space", Dr. William C. Brown, Microwave Power Transmission Systems, Space Manufacturing 8 Proceedings of the tneth SSI-Princeton Conference May 1991, pp. 25-31.

"Aluminum Salvage Station for External Tanks (ASSET)", Curtis H. Spenny, James N. Haislip, Robert E. Linscott, William Raynes, Michael Skinner, and David VanMatre, Air Force Institute of Technology, Space Manufacturing 8 Proceedings of the Tenth SSI-Princeton Conference May 1991, pp. 213-224.

"Further Developments in Very Large Truss Construction in Space", Anthony P. Coppa, General Electric, Space Manufacturing 7 Proceedings of the Ninth-Princeton/AIAA/SSI Conference May 1989, pp. 162-172.

"The Space Shuttle Operators Manual", Kerry Mark Joels, Gregory P. Kennedy, Ballantine Books, NY, 1982.

"Newton-A Variable Gravity Research Facility/Final Report", The International Space University, 1989.

"Space Solar Power Program/Final Report", The International Space University, 1992.

"Ranger Telerbotic Flight Experiment Program Update", Joseph D. Graves, University of Marylkand, Space Manufacturing 10 Proceedings of the Twelfth SSI-Princeton Conference May 1195, pp. 199-203.

"Space Solar Power—A Fresh Look at the Feasibility of Generating Solar Power in Space for Use on Earth" Science Applications International Corporation-Harvey Feingold, Michael Stancati, Alan Friedlander, Mark Jacobs, Futron Corporation-Doug Comstock, Carissa Christensen, Greggt Maryniak, Scott Rix, National Aeronautics and Space Administration-John C. Manks, Apr. 1997, Report No. SIAC-97/1005.

* cited by examiner

FIG. 4
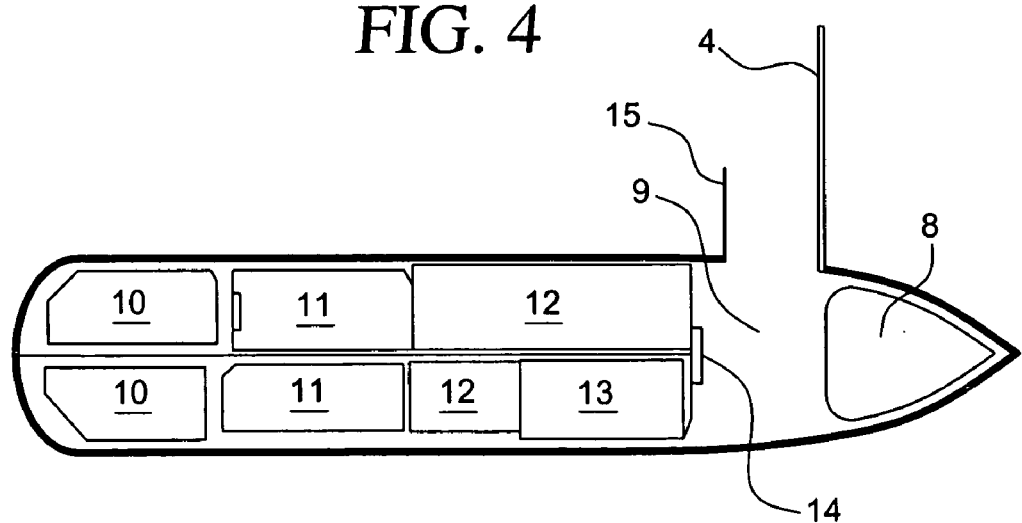
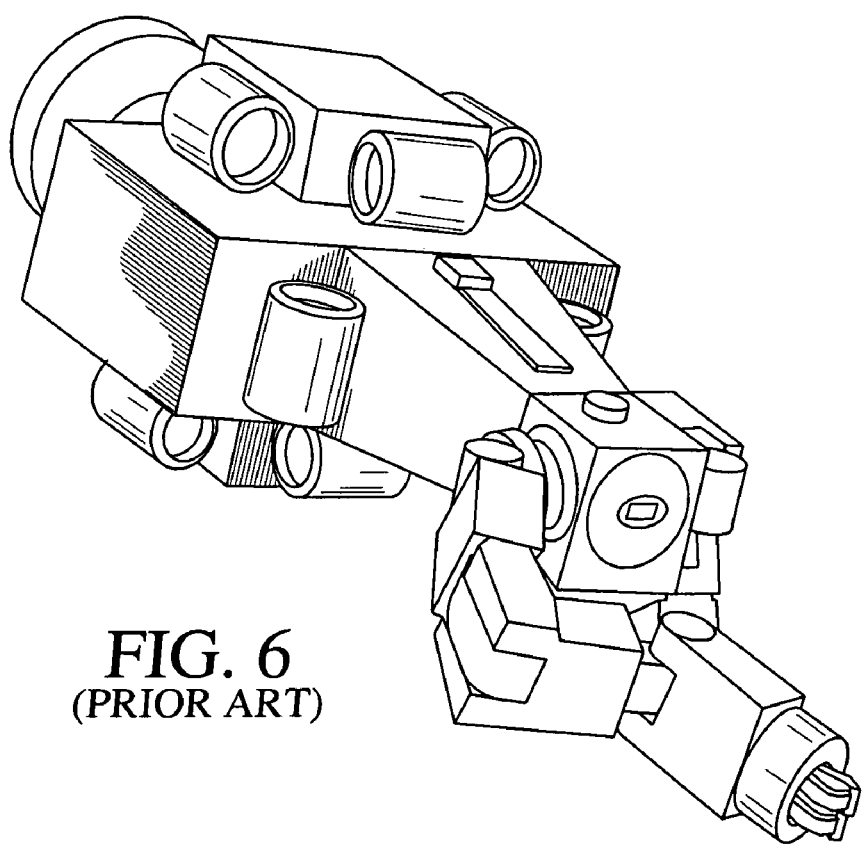
FIG. 6
(PRIOR ART)

Physical and Electrical Connections

METHOD FOR MANUFACTURING A SOLAR MODULE IN ORBIT

RELATED PATENT APPLICATION

This application is related to U.S. Provisional Patent Application No. 60/680,861, entitled "SOLAR POWER PLAN", filed May 13, 2005 in the name of Paul Roseman and incorporated by reference into the subject non-provisional application.

FIELD OF THE INVENTION

The present invention relates generally to the creation of a geosynchronous Solar Power Satellite System, and more particularly to the creation of an artificial gravity, closed ecology, multiple use structure in low earth orbit that manufactures modular solar power panels, modular transmitter arrays and truss structures.

In particular, a method of creating a geosynchronous solar power satellite system from a low earth orbit structure with artificial gravity and closed ecology that links re-manufactured expended rocket boosters with solar cells created on earth into modular solar panels. It also links re-manufactured expended rocket boosters with microwave transmitter elements created on earth into modular transmitter arrays. Both the solar panels and transmitter arrays are transported to geosynchronous orbit by electric engines (like ion engines).

BACKGROUND OF THE INVENTION

1. Cover Art—Space Manufacturing 9 Proceedings of the Eleventh SSI-Princeton Conference May 1993;
2. "Wireless Power Transmission—A Strategy for Decarbonizing Global Energy Use", Peter E. Glaser, Arthur D. Little, Inc, Space Manufacturing 9 Proceedings of the Eleventh SSI-Princeton Conference May 1993, pp. 335-341;
3. "The Equatorial Plane—The International Gateway to Space", Dr. William C. Brown, Microwave Power Transmission Systems, Space Manufacturing 8 Proceedings of the Tenth SSI-Princeton Conference May 1991, pp. 25-31;
4. "Aluminum Salvage Station for External Tanks (ASSET)", Curtis H. Spenny, James N. Haislip, Robert E. Linscott, William Raynes, Michael Skinner, and David VanMatre, Air Force Institute of Technology, Space Manufacturing 8 Proceedings of the Tenth SSI-Princeton Conference May 1991, pp. 213-224;
5. "Further Developments in Very Large Truss Construction in Space", Anthony P. Coppa, General Electric, Space Manufacturing 7 Proceedings of the Ninth-Princeton/AIAA/SSI Conference May 1989, pp. 162-172;
6. "The Space Shuttle Operators Manual", Kerry Mark Joels, Gregory P. Kennedy, Ballantine Books, New York, 1982;
7. "Ranger Telerobotic Flight Experiment Program Update", Joseph D. Graves, University of Maryland, Space Manufacturing 10 Proceedings of the Twelfth SSI-Princeton Conference May 1995, pp.199-203;
8. "Space Solar Power—A Fresh Look at the Feasibility of Generating Solar Power in Space for Use on Earth" Science Applications International Corporation—Harvey Feingold, Michael Stancati, Alan Friedlander, Mark Jacobs, Futron Corporation—Doug Comstock, Carissa Christensen, Greggt Maryniak, Scott Rix, National Aeronautics and Space Administration—John C. Mankins, April 1997, Report Number SIAC-97/1005;
9. "Newton—A Variable Gravity Research Facility/Final Report", The International Space University, 1989; and
10. "Space Solar Power Program/Final Report", The International Space University, 1992.

In the 1970's Dr. Peter Glaser presented a 5 Gigawatt Solar Power Satellite System. The outer space part consisted of a solar power collector array #21 (FIG. 1) and microwave transmitter #22 (FIG. 1) in geosynchronous orbit. The power collected there was beamed to earth where a rectenna #23 (FIG. 1) converted the energy into electricity to add to the electrical grid. In his plan the solar collector and microwave transmitter were constructed in geosynchronous orbit by astronauts from modular pieces manufactured on earth. This method proved to be too expensive to be feasible. Subsequently, the microwave power beaming and conversion processes were demonstrated, by Dr. William Brown and others. Since then, many plans have been offered to collect solar power in space. Because of the high cost of launching materials to low earth orbit, and even higher costs to geosynchronous orbit, none of them were economically competitive.

SUMMARY OF THE INVENTION

In accordance with the present invention, the low earth orbit manufacturing facility is created. Empty external tanks from Space Shuttle launches are collected in low earth orbit. They are then joined together, filled with habitat, manufacturing, environment recycling modules and engines. They are then rotated to create an artificial "mars normal" gravity environment.

Then the facility is used to manufacture the modular components of the Solar Power Satellite System. Additional empty external tanks and expended rocket boosters are collected. They are re-manufactured and mated to solar cells manufactured on earth and launched to low earth orbit. Modular solar panels are created. Truss structures are created. Modular transmitter arrays are created by mating transmitter arrays manufactured on earth and launched to low earth orbit, to truss structures. These modular solar panels and modular transmitter arrays are moved to geosynchronous orbit by unmanned vehicles using electric powered engines (like ion engines). Then the solar power panels and transmitter arrays are linked together in geosynchronous orbit to beam power back to earth.

BRIEF DESCRIPTION OF THE DRAWINGS

The foregoing objects and advantage of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 4 shows a cutaway diagram of an "outer ET" in the previous diagram where, upon rotation, there will be simulated a "mars-normal" artificial gravity environment;

FIG. 6 shows the RANGER NPV space vehicle of the prior art from the Space Systems Laboratory with its hands grasping an object;

DETAILED DESCRIPTION OF THE PREFERRED EMBODIMENTS

Creation of the Manufacturing Facility

In this preferred embodiment for the current space situation, for the creation of the manufacturing facility, an empty external tank (ET) #1 (FIG. 2) from the Space Shuttle is not discarded upon the Shuttle's launch to the International Space Station (ISS). Instead, the empty external tank (ET) is taken into orbit with the Space Shuttle. About 30 miles short of the International Space Station (ISS), the Shuttle disconnects and undocks from the external tank (ET).

Figure 2:
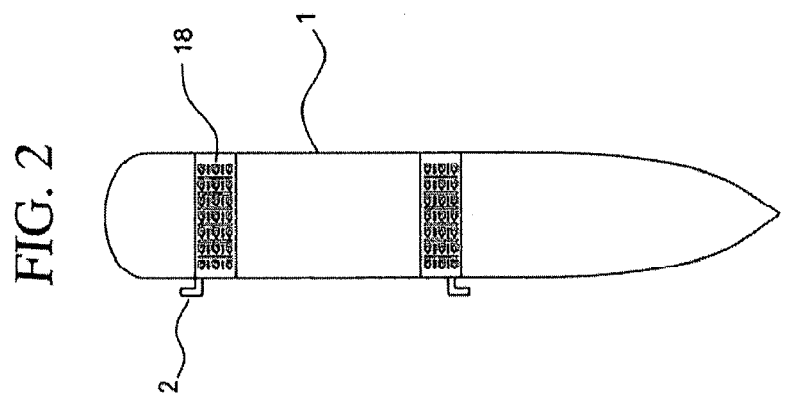
FIG. 2 shows an External Tank (ET) from a Space Shuttle launch. It has been outfitted with 2 solar power, electric engine (like ion drive) devices for station keeping.
Figure 12:
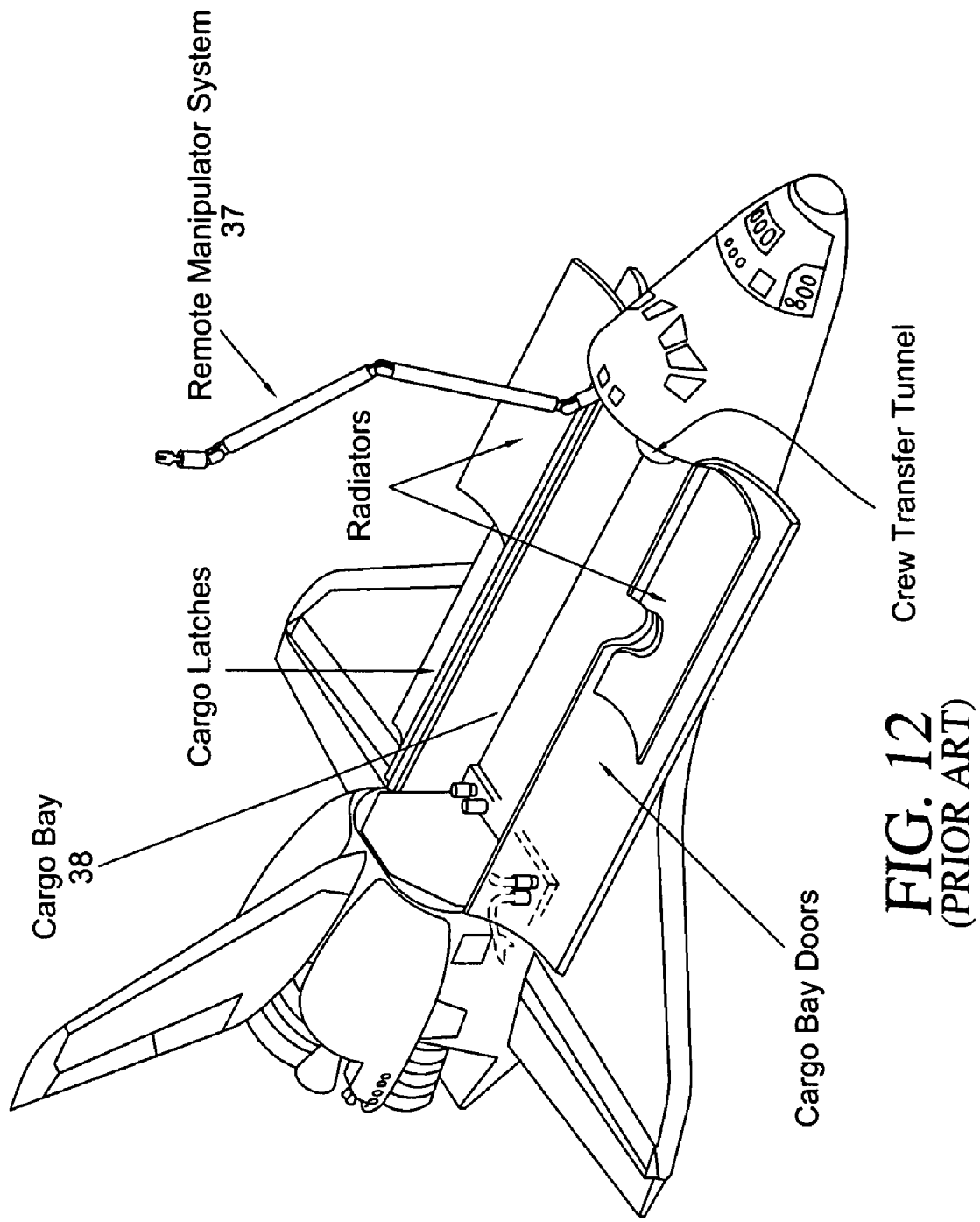
FIG. 12 shows a Space Shuttle of the prior art.

The external tank (ET) is fitted by the Shuttle Manipulator Arm #37 (a standard part of the Space Shuttle) with a station keeping device, which consists of a girdle of solar power cells #18 (FIG. 2) that connects to an ion engine #2 (FIG. 2). The Shuttle crew opens the cargo bay doors #38 (FIG. 12), and take out a wraparound solar panel with an ion engine #18,2 (FIG. 2), using the Shuttle Manipulator Arm #37 (FIG. 12). With the Shuttle Manipulator Arm #37 (FIG. 12), the Shuttle astronauts attach the wraparound solar panel with ion engine #18,2 to the external tank (ET).

Then they do this again, putting 2 wraparound solar panels with ion engines #18,2 onto the external tank (ET). Then the Shuttle backs away, and goes on its way to the International Space Station (ISS). The wraparound solar power panels with ion engines #18,2 allow the external tank (ET) to keep its orbit from decaying over time.

Two additional ET's are collected on separate missions in a similar fashion, and stored in the same location. Then the next Shuttle mission is dedicated to setting up the manufacturing facility. This will require an additional commercial launch (like the Ariane5), with additional supplies rendezvousing with the group of collected ETs about 30 miles short of the International Space Station (ISS).

On this mission, the Space Shuttle, still attached to its external tank (ET) rendezvous with the 3 stored ETs and the commercial launch payload at the site short of the ISS. The Shuttle uncouples from its attached ET. The ET is positioned perpendicularly to another ET. The base end of one ET #36 (FIG. 11) is attached to the middle of another ET, creating a "T" like structure. This task is repeated with the other pair of ETs so that 2 "T" structures have been created.

Then the base ends #36 of the ET the forms the top of the "T" are removed. The habitat #10 (FIG. 4), manufacturing #12,13 (FIG. 4) and ecology #11 (FIG. 4) modules are loaded into the empty hydrogen tank #34 (FIG. 11) of those ETs and then the base ends #36 are reattached.

Then the nose ends #35 (FIG. 11) of the ET that forms the base of the "T" are attached to the docking port #3 (FIG. 3) module. The structural cables #4 (FIG. 3) are attached. Then the manipulator robots #5-7 (FIG. 3) are attached to the structural cables #4. The solar power assembly tracks #16 (FIG. 3) are attached and then the solar panel assembly robots #17 (FIG. 3) are attached to the solar power assembly tracks #16. The ion engines #2 (FIG. 3) are repositioned and then they are fired up to start the rotation process to generate artificial gravity. At the distance of 100 m (the distance between the 2 outer ETs), 2 revolutions per minute will simulate a "mars normal" (0.4 of standard earth. gravity) on the outer ETs. And, for the inner ETs, any lesser variable gravity (like "moon normal" can be simulated wherever a floor is built.

The manufacturing facility makes if possible to cheaply and easily remanufacture the empty fuel tanks and booster rockets into solar panels because of its artificial gravity and closed ecology. Many closed ecologies have already been tested here on earth, but only in our gravity environment. Our manufacturing expertise is only in our gravity environment. To make it possible to more cheaply manufacture the solar power collector arrays and transmitter arrays, we first need to create an artificial gravity environment. Such environments in space can be produced most easily by rotation.

Figure 3:
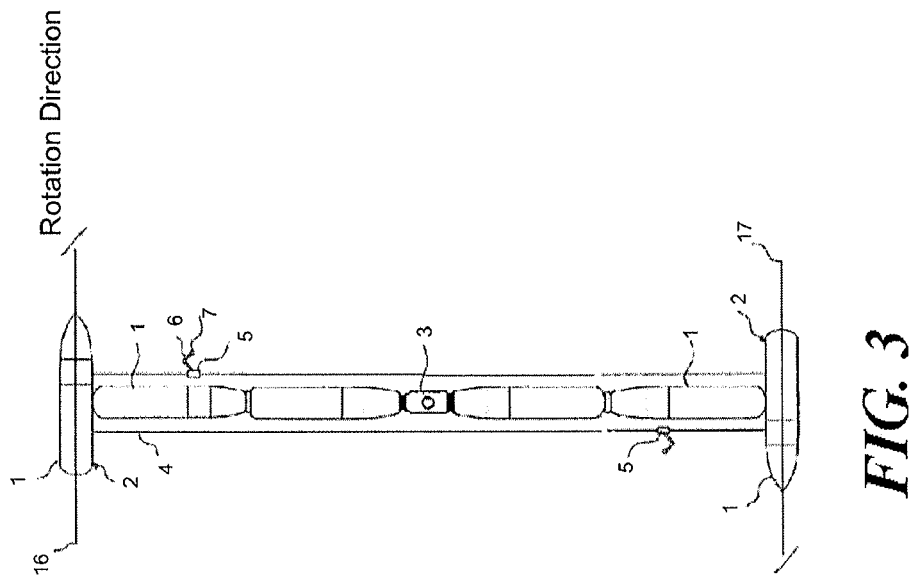
FIG. 3 shows the low earth orbit (LEO) artificial gravity, closed ecology, multi-use structure for manufacturing the solar power panels, the truss structures, and the transmitter arrays.
Figure 13:
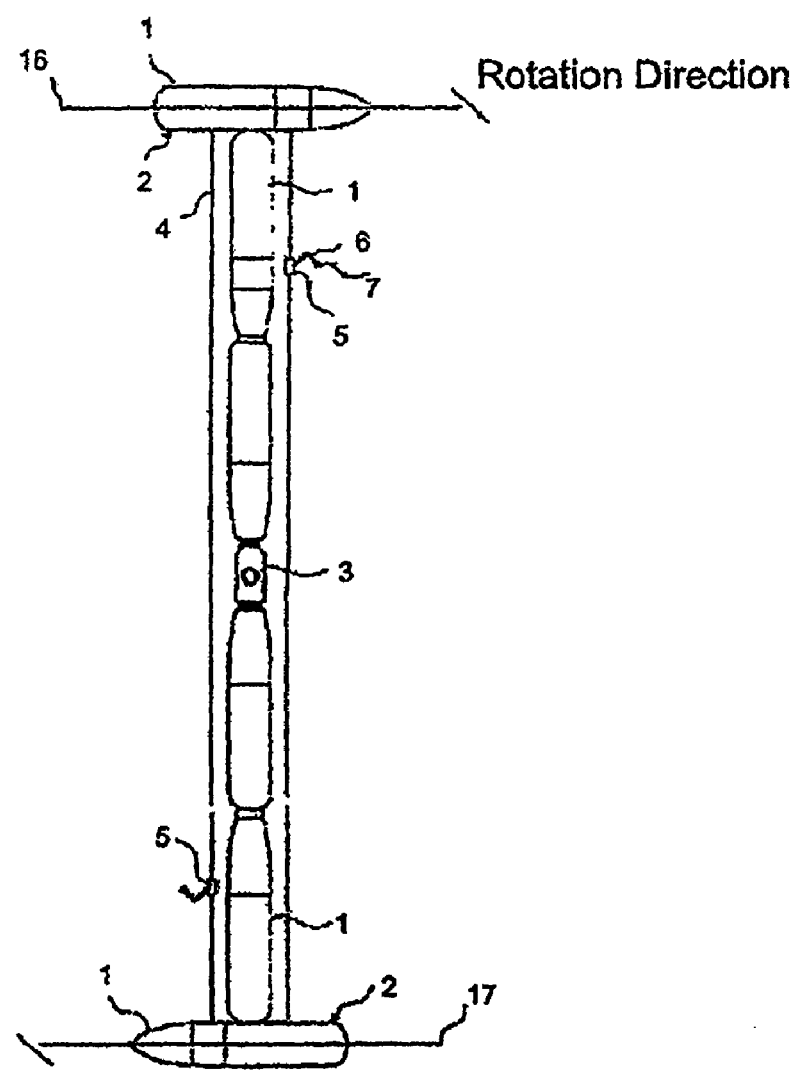
FIG. 13 shows a preferred embodiment of the low earth orbit (LEO) artificial gravity, closed ecology, multiuse structure for manufacturing the solar panels, the truss structure, and the transmitter arrays.

An artificial gravity environment is created when the manufacturing facility as depicted in FIG. 3 is rotated as indicated by the arrow. In a preferred embodiment an artificial gravity environment similar to that of Mars could be generated by a structure rotating twice a minute that has a radius of 300 feet (approx. 100 meters). In such case the manufacturing facility will have two additional external tanks as depicted in FIG. 13 to achieve the radius of 300 feet. This is the artificial gravity environment that's best for the manufacturing structure. The M(m)artian 0.4 g environment will not have a significant impact on the technologies developed on earth, either the closed-ecology or manufacturing technologies required to build the Solar Power Satellite project.

Operating costs for the facility will be low, because there is a low need for re-supply. This is directly because of the closed ecology technologies used. We can use Earth normal manufacturing equipment and methodologies, adapted to a closed environment, so they won't be expensive to buy and easy to run. It will be expensive to deliver and remove personnel, so that crew/worker durations will be long. In this embodiment, the remanufacturing facility should be built near the ISS to take best advantage of nearby infrastructure and transportation opportunities. Emergency return vehicles need to be available as lifeboats for the crew.

The working/living environment will be inside the hydrogen tank #34 (FIG. 11), in the ET, and so doubly shielded from space. The hydrogen tank #34 is 100 feet long by 27 feet in diameter. Turned into 2 floors, it would be about 5000 square feet per tank. Inside, various parts would be setup for habitat #10 (FIG. 4), foundry #13 (FIG. 4), machine shop #12 (FIG. 4) and closed-ecology equipment and facilities #11 (FIG. 4).

Manufacturing Process:

After setting up the modules built on earth—the habitat, ecology and manufacturing modules #10-14, the air lock to space #15 (FIG. 4) needs to be created, cut out of the intertank #33 (FIG. 11), #9 (FIG. 4).

Solar power modules, 100 meters square, are an output product of the manufacturing facility. The solar cells are manufactured on earth. They will be launched into LEO, aimed at the manufacturing facility. In this preferred embodiment, they will be captured and loaded into the facility. A space tug (FIG. 6) will capture the cargo and transfer it to the manipulator robots #5-7 (FIG. 3). The rocket that delivers the solar cells will be cut up and taken into the facility. Machines have been designed to cut ET's into cylindrical chunks. These chunks will be grasped by the manipulator robots #5-7 (FIG. 3). These manipulator robots #5-7 (FIG. 3) will be teleoperable and be attached to and move up and down the structural cables #4 (FIG. 3) with changing gravity at changing distances from the rotation center. These manipulator robots #5-7 (FIG. 3) will be needed to unload and store launched solar cells, cargo and the raw material stream. They will deliver them to the air lock to space #15 (FIG. 3. Everything then gets loaded into the remanufacturing facility through the air lock to plant #14 (FIG. 3).

The materials in the stream are already quite refined, being composed of empty fuel tanks, expended rocket boosters and captured "space junk". Most of the stream is made of aluminum, which is light and easily re-melted and reformed at low (700 deg F.) temperatures. The material stream will be melted down in the foundry #13 (FIG. 4), and turned into building material. The building pieces consist of metal sheets, pipes and pipe holders. The earth manufactured solar cells are attached to the sheets. The sheets are attached to the pipes to create the modular solar panels. The truss structures are created by attaching the pipes with the pipe holders. Because the air lock to space #15 is small by comparison to the size of the modular solar panel #18 (FIG. 5), the panels will have to be built in modular pieces. Also, to fit the 100 meter length of the panel out the air lock to space # 15, the panels will have to be rolled.

Figure 7:
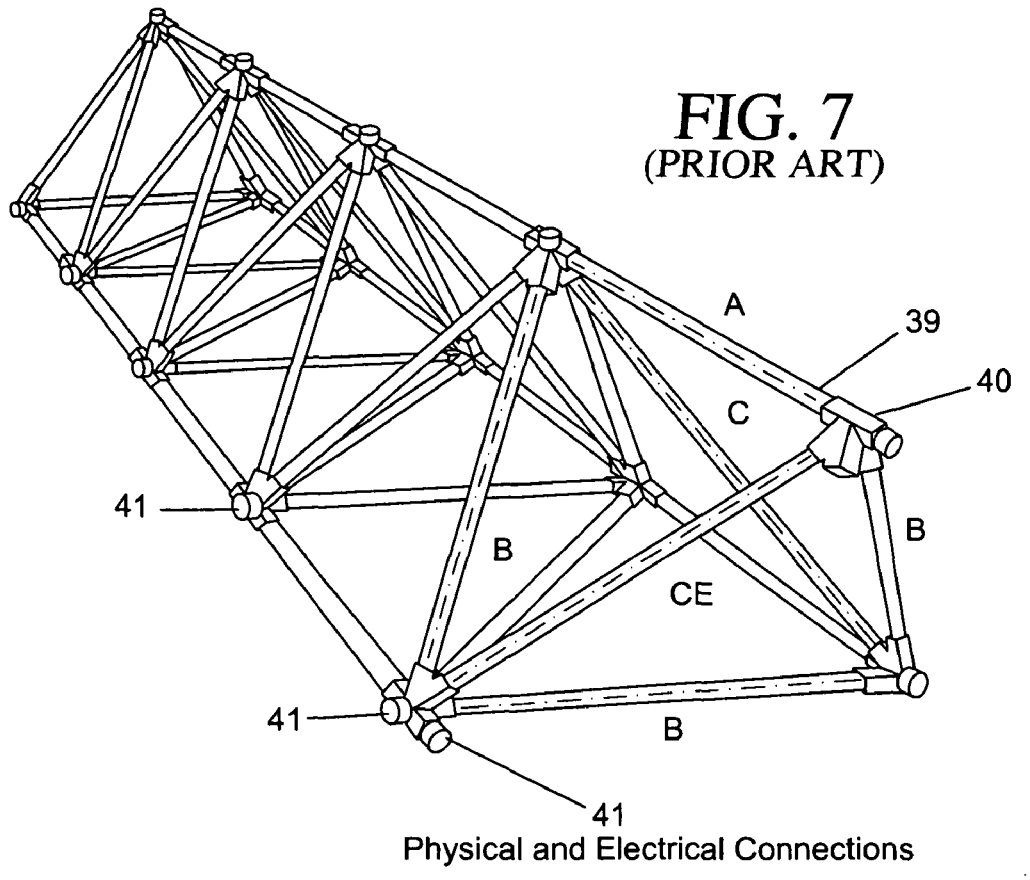
FIG. 7 shows the design for a truss structure of the prior art.
Figure 8:
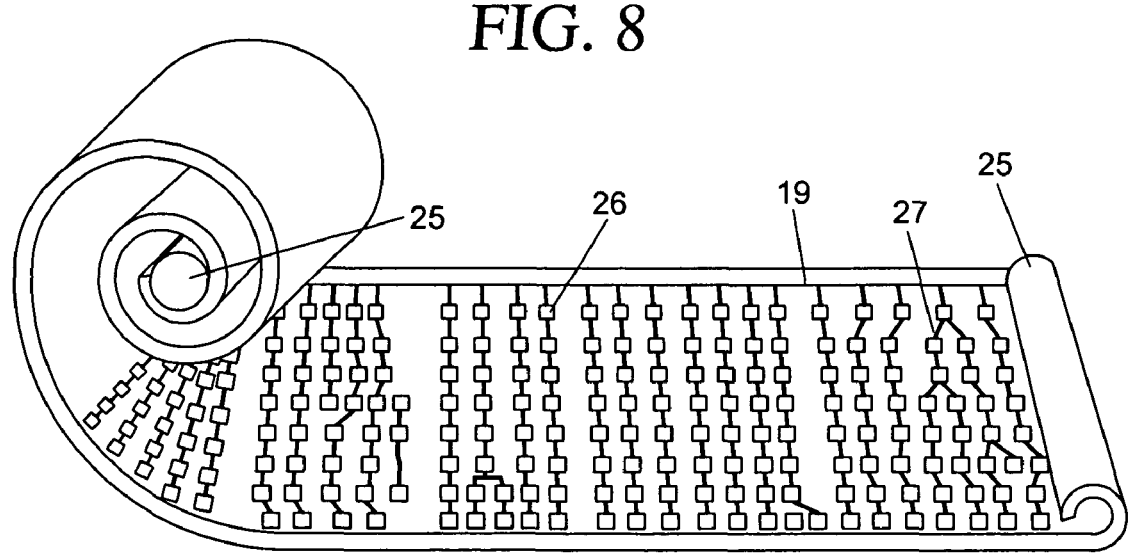
FIG. 8 shows a sub-panel of solar cells being rolled up for construction of the modular solar power panel.

To manufacture the solar panel #18 (FIG. 5) 15 foot wide rolls of thin aluminum #28 (FIG. 8) are created from the materials stream. The solar cells are attached to them, and wired up #27 (FIG. 8) to the solar panel bus connection #19 (FIG. 8). Then, one end of the roll is mated to a pipe segment #25 (FIG. 8). The pipe is rolled as more solar cells are attached and wired up and the other end attached to another pipe #25 after the 100 meter length is completed. Successful testing of the completed product finishes the process. Many of these are produced. Additionally, pipes are produced in 15 foot segments. All pipes connect physically and electrically to the pipe segments above and below them, and some come with physical and electrical connectors #41 (FIG. 7) to connect to truss structures and other pipes. They are tested and then put to use.

Figure 5:
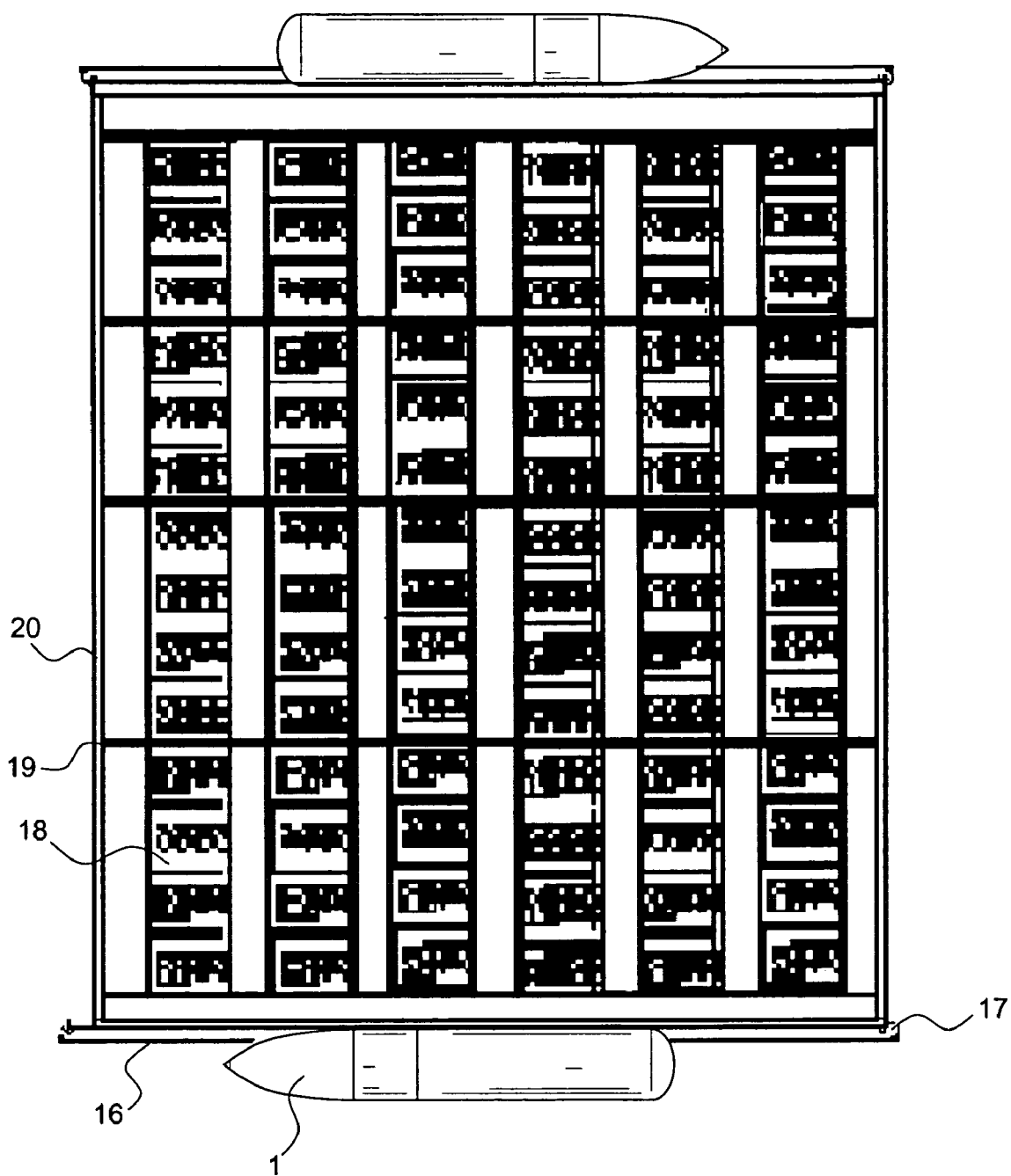
FIG. 5 shows the low earth orbit (LEO) artificial gravity, closed ecology, multi-use structure with a modular solar power panel constructed and ready to be taken to geosynchronous orbit (GEO)
Figure 11:
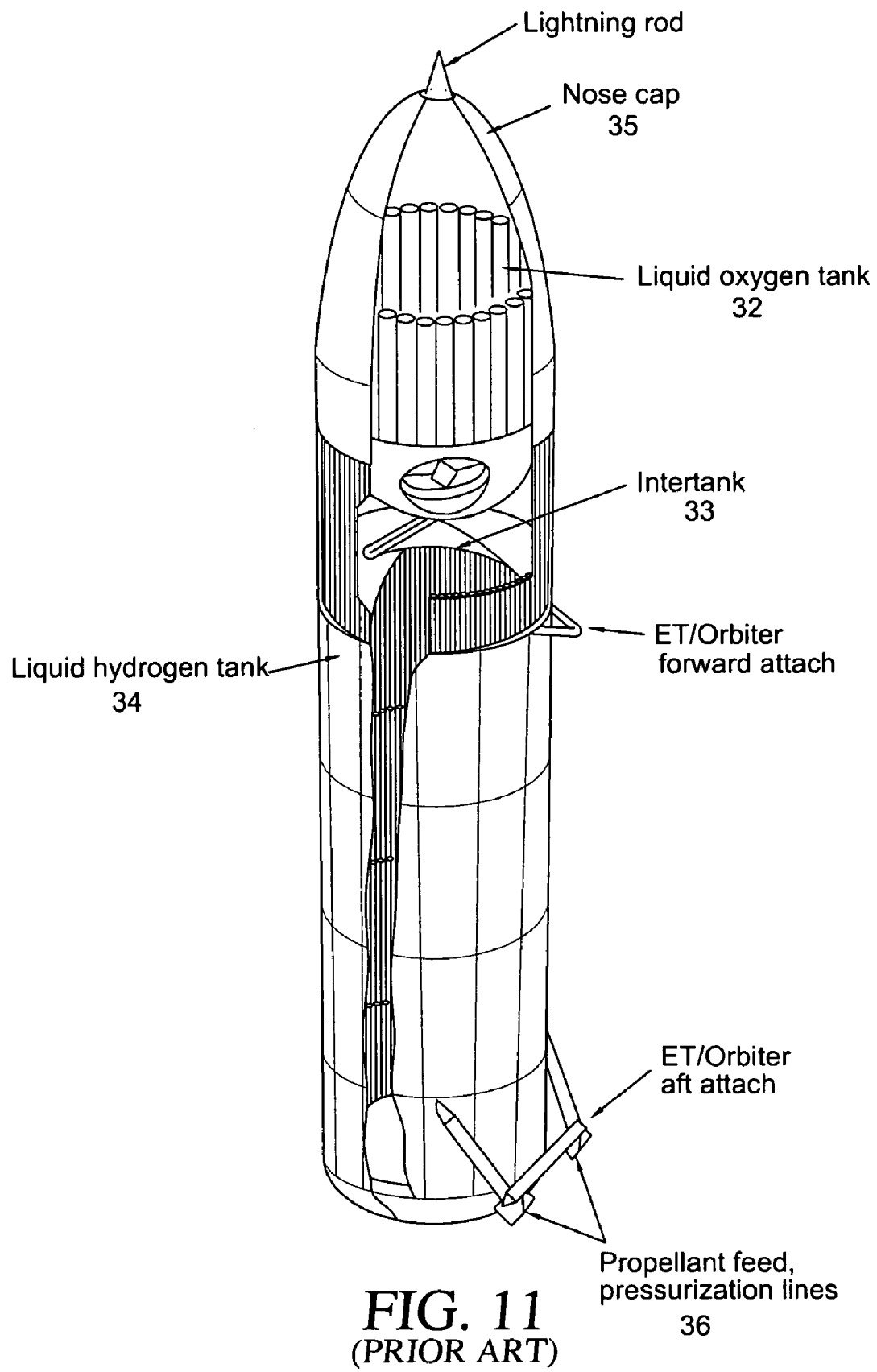
FIG. 11 shows a cutaway of the Space Shuttle External Tank (ET) of the'prior art.

The many pipe segments for 2 pipes #39, each 100 meters long, with 4 segments having physical and electrical connectors attached #41 are manufactured and stored in the intertank #33 (FIG. 11). Then the airlock to space #15 is opened. The manipulator robot #5-7 grasps a pipe segment #39 with physical and electrical connectors #41 attached and pulls it into space. Then a regular pipe #39 is attached to the bottom of the first pipe #39 and the assembly pulled up into space. This process is repeated until the last segment of pipe #39, with physical and electrical connectors #41 is attached to create the 100 meter length. The pipe is stored in one of the 2 solar panel assembly tracks #16 (FIG. 5). Another pipe is created in the same way and stored in the other solar panel assembly track #16.

The rolls of solar cells attached to pipes (FIG. 8) are then stored in the intertank #33. Then the airlock to space #15 is opened. The manipulator robot #5-7 grasps a segment, is pulls it up to outer space, then the next segment (FIG. 8) is attached. Both pipes #26 get attached to the previous segment. After the twin pipes #26 with the rolled solar cells extend the full 100 meter length, the top and bottom of the pipes #26 are attached to the solar panel assembly robots #17 (FIG. 5). One side of pipes and rolled solar cells are pulled out to the correct length on one side, and attached top and bottom to the pipe physical and electrical connectors #41 stored in the solar panel assembly track #16 (FIG. 5). Then the other pipe is pulled out to the correct size, and attached to the other physical and electrical connectors #41 attached top and bottom at the end of the solar power assembly track #16. In this way the modular solar power panels #18 are manufactured.

A space tug #24 docks at the remanufacturing plant (FIG. 3), gets grabbed by a manipulator robot #5-7 and is moved to allow it to attach with the solar panel #18. The clamps on the solar panel assembly track #16 release, and the space tug #24 takes the solar panel #18 away from the remanufacturing plant (FIG. 3). It carries it into nearby orbit, where the rotational spin is removed, and other solar panels #18, truss structures (FIG. 7), and modular microwave transmitter arrays #22 join the group for transport to geosynchronous (GEO) orbit.

Figure 1:
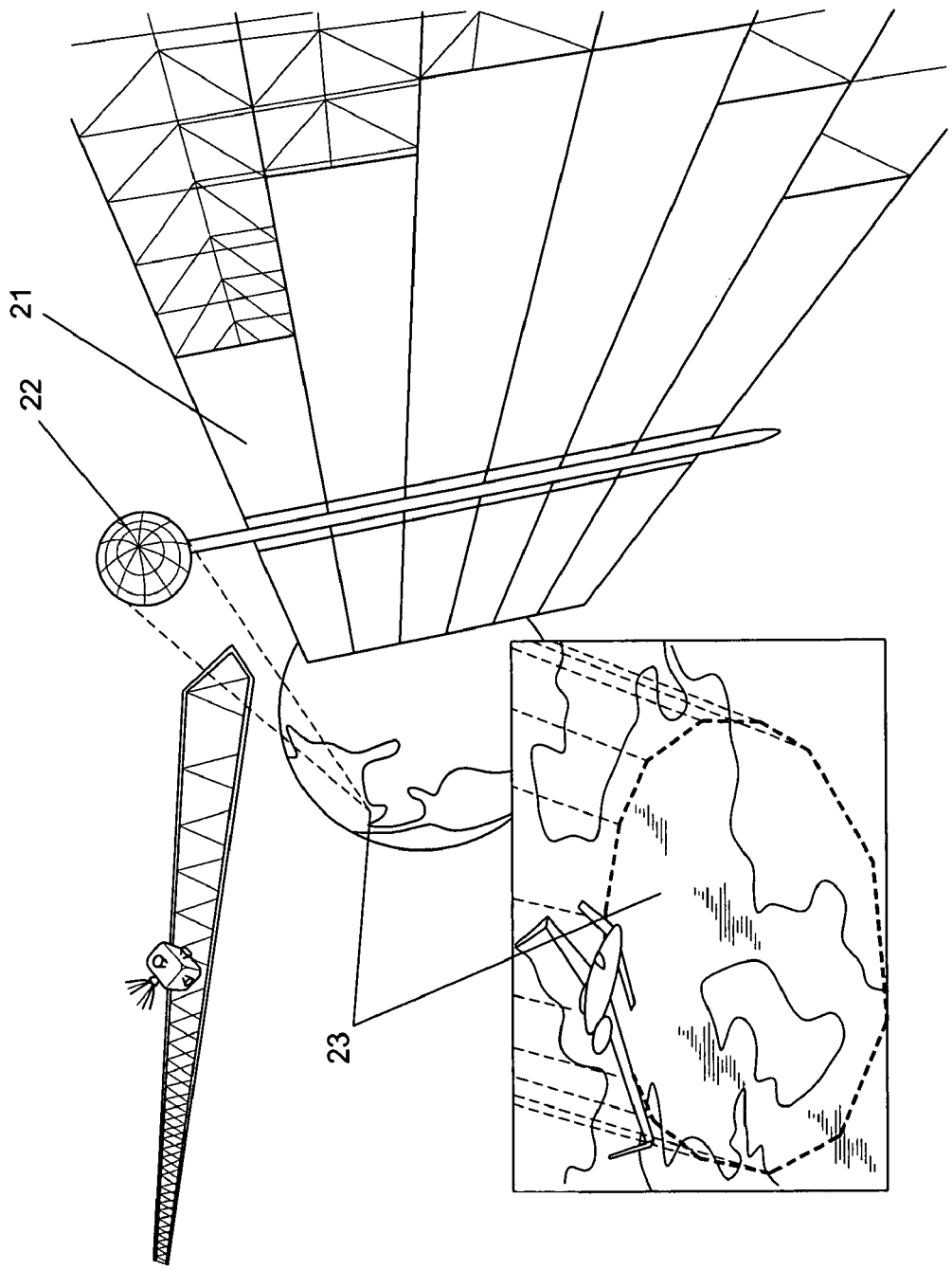
FIG. 1. discloses a prior art solar power satellite system.

In a similar manner, truss structures (FIG. 7) will be created for support and electrical management in the solar collection array (#21, FIG. 1). The pipes #39 will be linked into the truss structures in the machine shop (#12, FIG. 4), wired up and joined together in 15 meter lengths, and stored in the intertank #33. They will be linked together into the correct lengths by pulling them out of the airlock to space #15 by the manipulator robot (#5-7, FIG. 3) and attaching them together. As with the solar panels #18, when finished they will be picked up by the space tug #24. They will be linked together with the solar panels #18 and a space tug #24 for transport into geosynchronous orbit.

Microwave transmitter elements, manufactured on earth, will also be cargo that is delivered to the manufacturing facility. Modular pieces of transmitter arrays (#22, FIG. 1) will be created by connecting the transmitter elements to truss structures (FIG. 7) and wiring them together. These will manufactured into 15 foot lengths and stored in the intertank #33. Then they get connected together into 100 m lengths through the air lock to space (#15, FIG. 4) using the manipulator robot arms (#5-7, FIG. 3).

Figure 9:
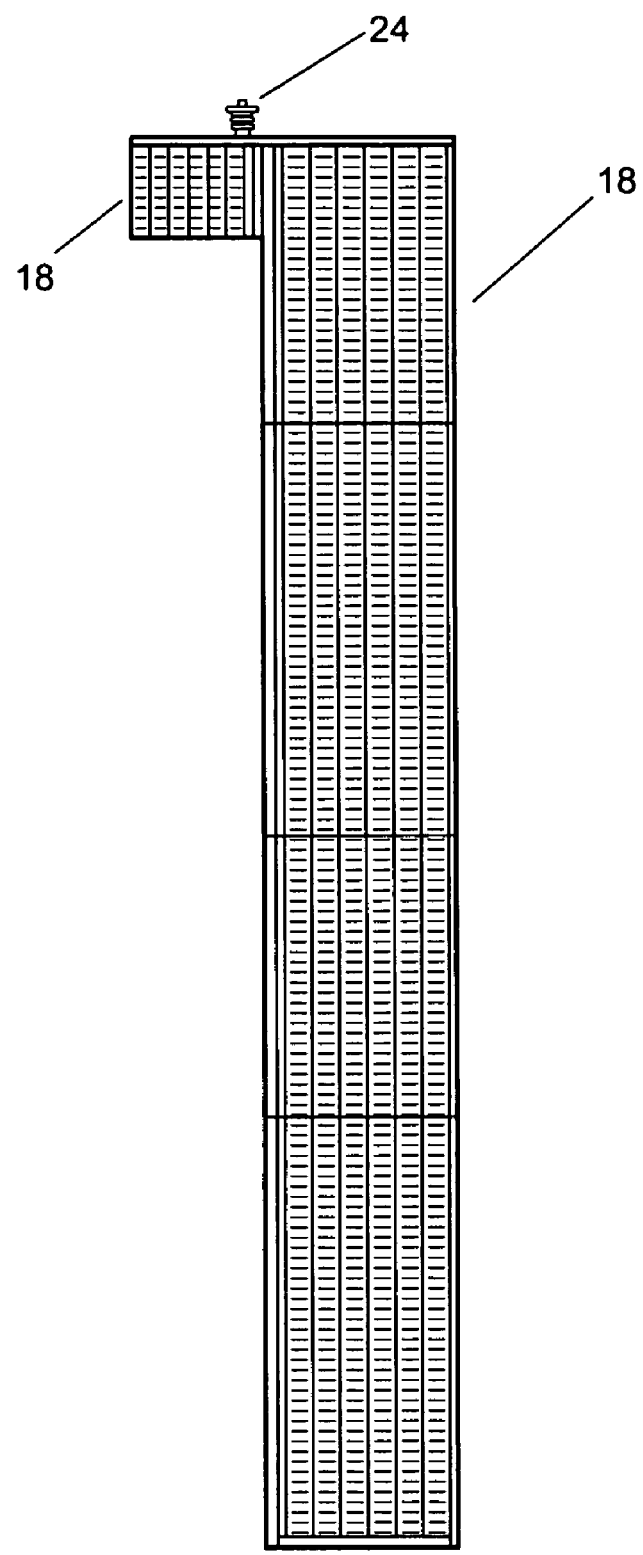
FIG. 9 shows a collection of modular solar power panels with truss structures, connected to a Ranger for transport to geosynchronous orbit (GEO)
Figure 10:
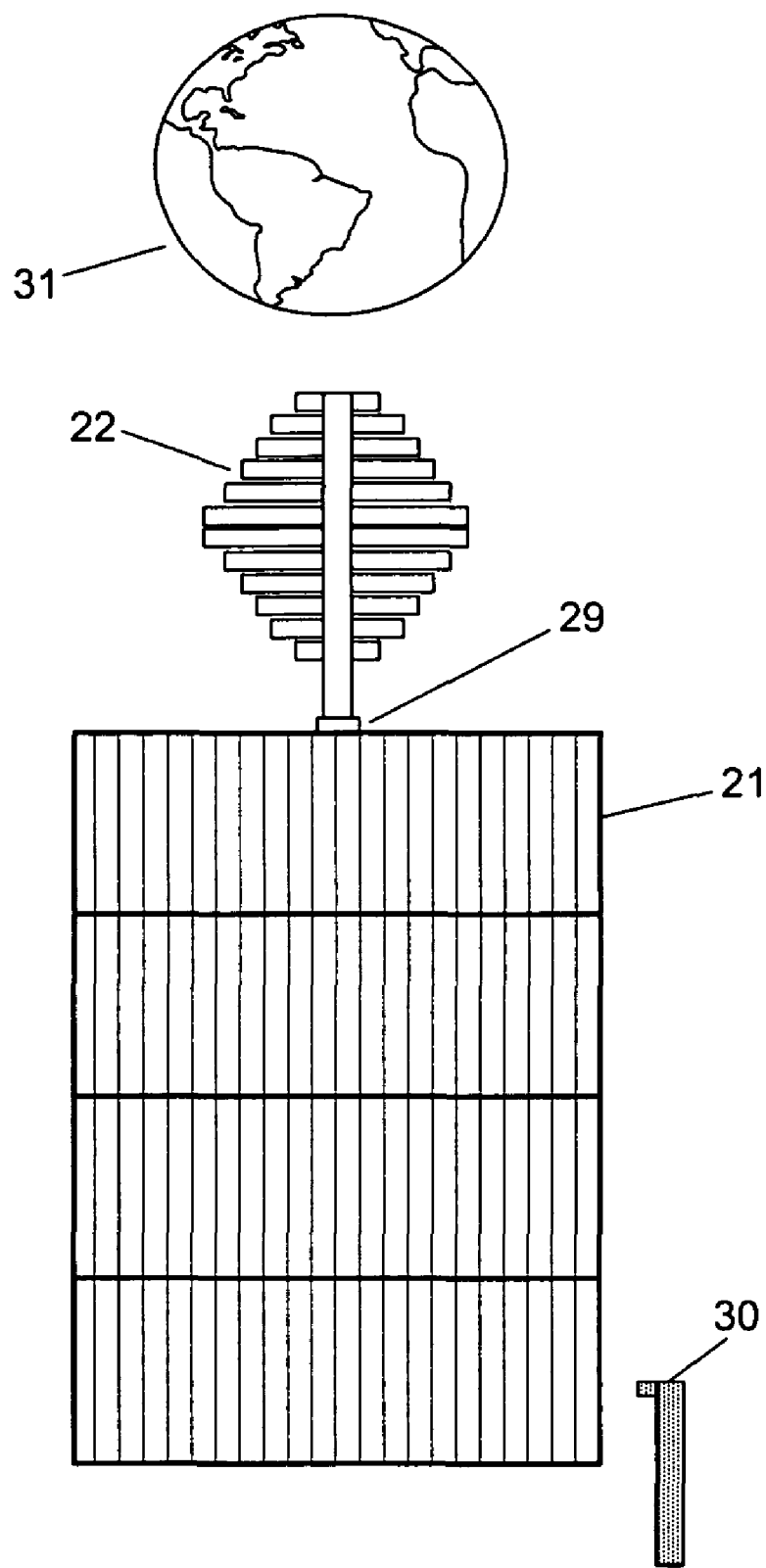
FIG. 10 shows a Solar Power Satellite, with collection array, and transmitter.

Then the solar power modules (FIG. 5), the modular transmitter arrays (#22, FIG. 1), and the truss structures (FIG. 7) will be individually picked up by a space tug (FIG. 6). The solar power modules (FIG. 5) will be linked together in nearby space into a 10 grid shape bounded on both ends by a truss structure, with an additional solar power module (FIG. 5) connected to a truss structure (FIG. 7). The modular transmitter arrays (#22, FIG. 1) also link to the truss structure (FIG. 7). A space tug (FIG. 6), equipped with electric powered engines (like ion drives) will dock and move the group to geosynchronous orbit (GEO). The additional solar power module will furnish power to the Space Tug (FIG. 6) for delivery and return. At geosynchronous orbit the Space Tug (FIG. 6) will disconnect from the 10 grid structure, and connect that structure to the Solar Power Array (#21, FIG. 1). If there is a modular transmitter array #22 with the space tug #24 group (FIG. 9) then it is attached to the transmitter array #22. Then the Space Tug (FIG. 6), with the single remaining solar power module (FIG. 5) returns to the manufacturing facility (FIG. 3) in LEO, and the process repeats until the solar power collection array (#21, FIG. 1) is collecting the required energy and transmitting it, by the Microwave Transmitter (#22, FIG. 1) to earth.

Although the present invention has been described in terms of various embodiments, it is not intended that the invention be limited to these embodiments. Modification within the spirit of the inventions will be apparent to those skilled in the art. The scope of the present invention is defined by the claims that follow.

LIBRARY OF TERMS

1) External Tank (ET)
2) Ion Engine
3) Docking Port
4) Structural Cable
5) Manipulator Robot—Moveable Carriage
6) Manipulator Robot—Rotating Arm
7) Manipulator Robot—Grasping Claw
8) External Tank—Oxygen Tank
9) External Tank—Intertank
10) Habitat
11) Closed Ecology Maintenance
12) Machine Shop
13) Foundry
14) Air Lock to Plant
15) Air Lock to Space
16) Solar Panel Assembly Track
17) Solar Panel Assembly Robot
18) Solar Panel
19) Solar Panel Bus Connection
20) Solar Panel Frame
21) Solar Collection Array
22) Microwave Transmitter
23) Rectenna
24) Ranger
25) Pipe
26) Solar Power Cell
27) Solar Cell Wiring
28) Solar Cell Backing—Aluminum Roll
29) Rotating Cap
30) SPS Panels w/Ranger
31) Earth
32) ET—Liquid Oxygen Tank
33) ET—Intertank
34) ET—Liquid Hydrogen Tank
35) ET—Nose Cap
36) ET—Propellant Feed Lines
37) Space Shuttle—Manipulator Arm
38) Space Shuttle—Cargo Bay
39) Truss Structure—Pipe
40) Truss Structure—Pipe Holder
41) Truss Structures—Physical and Electrical Connector

I claim:

1. A method for creating a solar power array in a geosynchronous orbit, said method comprising the steps of:
   a) capturing a plurality of empty tanks taken into low earth orbit;
   b) constructing in low earth orbit a manufacturing facility capable of creating an artificial gravity environment;
   c) boosting solar cells manufactured on earth to low earth orbit;
   d) assembling in an artificial gravity environment at the manufacturing facility modular solar panels comprised of the solar cells which are connected to the panels, the panels being fabricated from rockets used to deliver the solar cells to the manufacturing facility; and
   e) boosting the modular solar panels into geosynchronous orbit.

2. The method of claim 1, wherein constructing in low earth orbit the manufacturing facility comprises in part, from a plurality of launches carrying the plurality of empty tanks into low earth orbit, assembling a plurality of empty tanks to construct the manufacturing facility in an "H" configuration.

3. The method of claim 2, wherein creating the artificial gravity environment includes in part positioning engines on opposite ends of the manufacturing facility; and firing up the engines to cause the manufacturing facility to rotate to generate artificial gravity within each of the tanks.

4. The method of claim 2, comprising installing within the captured empty tanks a habitat for humans, a machine shop and a foundry.

5. The method of claim 1, comprising capturing objects left in space and additional empty boosters from subsequent launches; and wherein assembling at the manufacturing facility comprises remanufacturing the captured objects into building material including pipes, assembling the pipes into frames, and attaching the solar cells manufactured on earth to the frames made up of pipes.

6. The method of claim 5, wherein remanufacturing the captured objects comprises melting some of the captured objects.

7. The method of claim 1, comprising coupling a transmitter array to the modular solar panels; collecting energy by the solar cells of the modular solar panels; and transmitting by the transmitter array to earth at least a portion of the collected energy.

8. The method of claim 1, comprising taking the empty tanks by a plurality of boosters into low earth orbit.

9. The method of claim 3 wherein the center of the "H" is formed by attaching at least two tanks end to end along their longitudinal axis and attaching to a first exposed end of the at least two tanks a first end tank along a side of the first end tank and attaching to a second end of said at least two tanks a second end tank along a side of the second end tank and wherein the step of positioning the engines at the opposite ends of the manufacturing facility comprises attaching them to each of the end tanks.

10. The method of claim 9 wherein the at least two tanks create a radius of approximately 300 feet or a total distance between the end tanks of approximately 600 feet to thereby allow the creation of a Mars like gravity in each of the end tanks when the manufacturing facility is rotated at two revolutions per minute.

11. The method of claim 10 wherein the a least two tanks creating a radius of at least 300 feet are four tanks of approximately 150 feet in length attached end to end creating a distance of approximately 600 feet between the two end tanks.

* * * * *